United States Patent
Maeng

(10) Patent No.: US 7,363,589 B1
(45) Date of Patent: Apr. 22, 2008

(54) SYSTEM AND METHOD FOR GENERATING INVISIBLE NOTES ON A PRESENTER'S SCREEN

(75) Inventor: Joon Maeng, Austin, TX (US)

(73) Assignee: Tandberg Telecom A/S, Lysaker (NO)

( * ) Notice: Subject to any disclaimer, the term of this patent is extended or adjusted under 35 U.S.C. 154(b) by 1191 days.

(21) Appl. No.: 09/627,731

(22) Filed: Jul. 28, 2000

(51) Int. Cl.
    *G06F 3/00* (2006.01)
(52) U.S. Cl. .................. 715/751; 715/753; 715/759; 715/741; 715/719; 715/790; 715/797
(58) Field of Classification Search .............. 345/751, 345/753, 759, 741, 743, 717, 719, 853, 7.89, 345/790, 797; 715/751, 753, 759, 741, 719, 715/717, 853, 789, 790, 797
    See application file for complete search history.

(56) References Cited

U.S. PATENT DOCUMENTS

| | | | | |
|---|---|---|---|---|
| 5,557,320 | A | 9/1996 | Krebs | 348/12 |
| 5,608,872 | A | 3/1997 | Schwartz et al. | 395/200.04 |
| 5,748,499 | A | 5/1998 | Trueblood | 364/551.01 |
| 5,781,901 | A | 7/1998 | Kuzma | 707/10 |
| 5,822,537 | A * | 10/1998 | Katseff et al. | 709/231 |
| 5,828,372 | A * | 10/1998 | Kameda | 345/751 |
| 5,917,480 | A | 6/1999 | Tafoya et al. | 345/302 |
| 5,920,694 | A | 7/1999 | Carleton et al. | 395/200.35 |
| 6,008,804 | A | 12/1999 | Pommier et al. | 345/330 |
| 6,014,689 | A | 1/2000 | Budge et al. | 709/206 |
| 6,292,204 | B1 * | 9/2001 | Carleton et al. | 345/753 |
| 6,342,906 | B1 * | 1/2002 | Kumar et al. | 345/751 |
| 6,343,314 | B1 * | 1/2002 | Ludwig et al. | 709/204 |
| 6,487,583 | B1 * | 11/2002 | Harvey et al. | 709/204 |
| 6,542,165 | B1 * | 4/2003 | Ohkado | 715/751 |

* cited by examiner

*Primary Examiner*—Weilun Lo
*Assistant Examiner*—Mylinh Tran
(74) *Attorney, Agent, or Firm*—Oblon, Spivak, McClelland, Maier & Neustadt, P.C.

(57) ABSTRACT

Disclosed is a system and method for electronic-based communication between a plurality of remote users. The system includes a plurality of remote workstations, interconnected via a communication network, so that users may simultaneously view a target file. Further, the system may permit one or more of the users to view additional information, such as annotations or notes that relate to the target file. Such additional information may be part of the target file or it may be a separate file that corresponds to the target file. Also disclosed are methods for using such a system.

12 Claims, 4 Drawing Sheets

SYSTEM AND METHOD FOR GENERATING INVISIBLE NOTES ON A PRESENTER'S SCREEN

BACKGROUND OF THE INVENTION

1. Field of the Invention

The present invention relates to a system and method for electronic presentation, in which multiple displays are available for viewing by one or more of a plurality of users of the system. Furthermore, the invention relates to permitting notes to be displayed on one or more of the multiple displays, while remaining hidden from the other displays.

2. Description of the Related Art

In known presentation systems, a speaker often uses a series of slides to present graphic materials to an audience, via a projector or other video presentation device. Oftentimes, the slides are accompanied by comments relating to the slides by the speaker. The speaker may use notes, annotations, or the like. These notes are usually readily available to the speaker, and may consist of an annotated version of the graphic materials.

More recently, with advances in computing and related software, users can create a presentation using software, so that slides or other graphic materials are available in electronic format. Further, it is known that computers, such as a notebook or laptop computer, may be connected to a presentation device so that the electronically stored presentation may be displayed to an audience. One drawback in such a system is that the speaker cannot view his notes at the same time as the presentation materials on the computer. One suggestion to remedying this problem is disclosed in U.S. Pat. No. 5,917,480, the disclosure of which is expressly incorporated by reference herein. In that patent, the inventors disclose displaying notes in a control window which is part of the display screen of the computer. However, problems exist in that the control window is relatively small, and the notes are not overlaid over the slide, as would be the case with handwritten notes on a printed slide.

Also, with the advent of the Internet and videoconferencing, remote users can simultaneously view a presentation at remote locations. Again, the same problem exists that a presenter cannot view presentation notes on the same display as the presentation.

SUMMARY OF THE INVENTION

The present invention is directed to a system and method for electronic-based communication between a plurality of remote users. Specifically, in one embodiment, the system includes a plurality of remote workstations, interconnected via the Internet or other communication network, such as a videoconferencing system. Using the workstations, the users may simultaneously (or asynchronously) view a target file, which may be, for example, a text file, a graphic file, a combination thereof, or any other type of file. In an example embodiment, the target file may be a project on which the users are collaborating, such as a report, presentation, publication, technical design, or the like. Further, in an example embodiment, the system may permit one or more of the users to view additional information, such as annotations or notes that relate to the target file. Such additional information may be part of the target file or it may be a separate file that corresponds to the target file.

In a method of using the system, a group of users may make a presentation occurring via a global communication network, such as the Internet, videoconferencing system, or the like. Alternately, such presentation may occur at a single location, such as a meeting room, conference or the like. Typically, such a presentation is given by one of the users (the "presenter" or "leader"). A leader may operate a workstation to access and control the presentation. Such a workstation may have a local display for the leader to view, as well as means to deliver the presentation to the other users.

Using the system, the leader may access the target file, which contains the material to be displayed in the presentation, which may consist of slides, viewgraphs, animations, or the like, and display the file to the other users. As discussed above, such users may be remotely located, or may be at the same location as the leader. In an example embodiment, the leader may also access an annotation file for display on the local display. For example, the annotation file may contain the leader's notes regarding the presentation. In certain embodiments, the annotation file may be part of the target file, but be encoded so that it is only displayed on the local display. The annotation file may be displayed as an overlay to the target file, so that the leader can view both the target file, as seen by all users, and the annotation file, which is only seen by the leader.

In certain embodiments in which users are remotely connected, more than one user may have access to annotation files relating to the target file, so that each of these users can view individual annotation files. In such way, the group may communicate and/or collaborate remotely on the target file, with at least some of the users having access to his or her annotations regarding the target file. In an example embodiment, the users may be interconnected using a videoconferencing system, such as available from VTEL Corporation, Austin, Tex. Further, by connecting user workstations to the videoconference system, the group may actively collaborate on a given target file. Similarly, the users may be connected via telephone, electronic mail, video mail, or the like.

In other embodiments, a system may be used in connection with customer service systems and the like to permit remote electronic communication between a customer and a representative. In an example embodiment, such a system may include a user workstation located at a customer service location and a remote workstation at a customer site (such as a home computer). Using such an arrangement, the customer service representative may access a file relating to the customer and provide it for display at both the representative location and the customer location. Further, the representative may access and display an annotation file solely at the representative location. Using such a system, the representative and customer may discuss particulars regarding a customer account while both have access to certain account information, and the representative has access to additional account information, such as a customer ranking, notes from other representatives, and the like.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
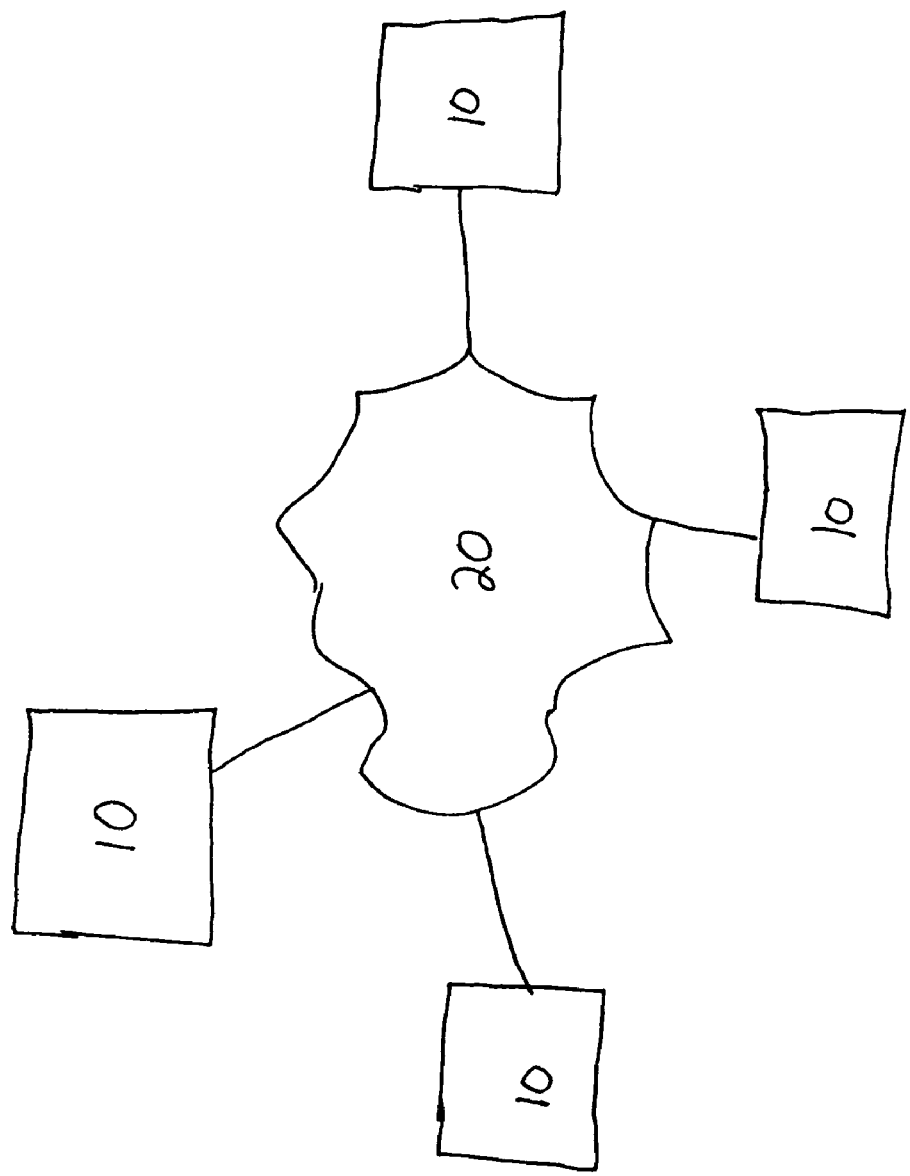
FIG. 1 is a block diagram of an example embodiment of a system that implements the present invention.

As shown in FIG. 1, in one example embodiment, the system includes a plurality of remote users each having a user workstation 10 interconnected via a global computer network 20, such as the Internet or the like. In example embodiments, the user workstations may be a personal desktop computer, laptop computer, personal digital assistant, Internet appliance, and the like.

Using the system and methods disclosed herein, the remote users can interactively view an electronic file, such as a presentation, report, publication, or the like. Further, the users may act to collaborate together on such a file. In operation, the file may be accessed at the command of one of the remote users (i.e., the "leader"). In example embodiments, the leader may access the file from a central storage location, such as a central server or storage system (not shown in FIG. 1) to which the leader has access, or alternately access the file from its workstation or another such location. In an embodiment using a server, such as a web server, the users may access the file via a Hypertext Transfer Protocol (HTTP) or other client/server protocol. Of course, it is to be understood that each of the users may independently be able to access the file via the Internet or other computer network.

The accessed file may then be displayed on each of the user's workstations. When the file is so displayed, the group (i.e., two or more users) can use the file as desired. For example, the leader may make a presentation using the file as the presentation's video materials. In an example embodiment, the leader may make the presentation via a videoconferencing system in which the leader's workstation is coupled to the system. In this way, the video materials may be displayed on video monitors present at each location of the videoconference system. Alternately, in the case of a collaboration, one or more of the users may be authorized to edit the main file.

Example workstations for the leader and other users may include accessory components to provide for videoconferencing, such as videoconferencing workstations. Such videoconferencing workstations may include an audio and video processing card, input/output card, communications card, and the like. One such videoconferencing workstation with data collection capabilities may be the VTEL SMART-STATION, commercially available from VTEL Corporation.

After display, the group may discuss the file, such as with a group project, using a telephone system, videoconference system, electronic or video mail, or the like. Further, remote users may also couple workstations to the videoconferencing system so that when the accessed file is displayed over the system, the group of users may then collaborate synchronously such that some or all of the users may access and edit the document. Alternately, it may be possible for only a single user to have control over the file such that only one user can edit the document.

In an embodiment incorporating videoconferencing, a multiway conference unit (MCU), such as the VTEL H.320 MCS and the H.323 MCS, which are devices that connect multiple videoconferencing systems via ISDN or packet switched networks such as the Internet, may be used. In an example embodiment, an MCU for ISDN may have multiple primary rate interface (PRI) lines to connect multiple ISDN-based calls. An MCU for packet switched networks may have an Ethernet connection to send and receive multiple video and voice calls through the shared network.

In a further aspect of an example embodiment, an annotation file, which may contain notes, comments, annotations, or the like relating to the first file, may also be accessed by one of the users. For example, this second file may be the leader's notes regarding a presentation or a document in progress. In other embodiments, it is to be understood that this second file may be part of the first file, and may be encoded with an identification code such that the file may be viewed only on a particular user's (e.g., the leader's) display. In an example embodiment, the identification code may include a user name and password. Further, there may be a plurality of such files so that various individual users may have annotation notes appearing only on their workstation.

In an example embodiment, the first file and the annotation file may be stored in a server or other central storage device to which the users have access. In an example in which each of the plurality of users has an individual annotation file, the individual annotation files may be stored on the server or central storage device, or alternately be stored on the individual workstations. Furthermore, in such an embodiment, there may also be a common annotation file which is viewable to all of the users.

In certain embodiments, the leader or another user having access to an annotation file may desire that the file be shared with one or more of the other users. To do so, the user may provide a command to its workstation and select the user or users who are permitted to access the annotation file. Access may be provided by e-mail, via a central database (e.g., of an application service provider ("ASP")) to which the users have access (such as via a linked Uniform Resource Listing ("URL") containing a hyperlinked address). In this way, users at multiple locations may jointly give a presentation and share presenter's notes.

As discussed, the annotation file may be displayed on the selected display as an overlay to the first file. Such an overlay display stands in contrast to displaying annotations as a control or inset window on a display, as disclosed in U.S. Pat. No. 5,917,480, discussed above. Alternately, other presentation styles are contemplated, such as a separate window, which the user may access via use of a hot key or the like. In other embodiments, the annotation file may be displayed over a portion of the screen, such as at the margins of the first file.

It is to be understood that both the first file and the annotation file may be created using well known software programs, such as word processing programs, spreadsheets, graphics programs, and the like. Further, the files may be created and stored in a variety of different file formats and via a variety of different storage media, such as optical, magnetic, electronic media, and the like. In addition, it is to be understood that the files may be developed for use via the Internet or other global communication network, using well known languages, such as hypertext markup language ("HTML") or the like.

Figure 2:
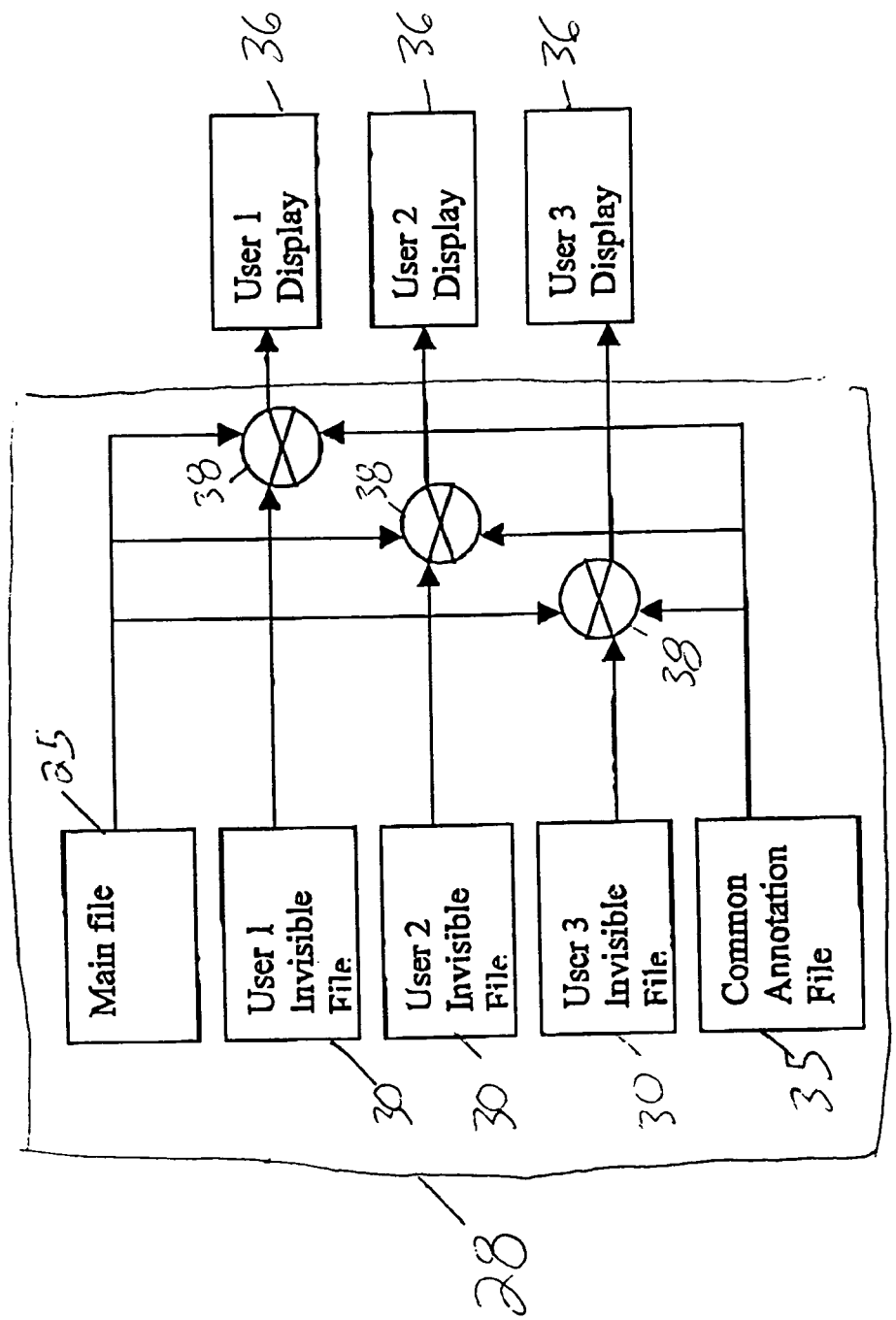
FIG. 2 is a block diagram of example files in accordance with the present invention.

Similarly, multiple users may see the same notes or comments regarding a first file. For example, FIG. 2 shows a block diagram of an example embodiment of a system in which multiple users have individual annotation files. As shown in FIG. 2, a first file 25 is stored in a central server 28 along with three user annotation files 30, and a common annotation file 35. The central server 28 is coupled to a plurality of user displays 36. Although shown in FIG. 2 as having three user displays, it is to be understood that in example embodiments there may be fewer or greater numbers of such displays.

As discussed above, the first file 25 may be the main file on which the group is collaborating, and the common annotation file 35 may include notes, annotations, and the like viewable by all of the users. Further, the user annotation files 30 may include notes, annotations, and the like that are only viewable by the individual users. In an example embodiment, these user annotation files 30 may appear on the user's display 36 as a different color or have some other indication that the file is not viewable by other users.

As shown in FIG. 2, an overlay junction, designated by 38 in FIG. 2, in which the plurality of files accessible by a user are combined and sent to that user's display 36 as overlays to each other, may be present in the server. The overlay junction 38 shown in FIG. 2 may be a logical function. In an example embodiment, there may be hardware or software that combines bit maps of the multiple files 25, 30, and 35 into a single display output. For example, there may be a temporary memory in which all three files 25, 30, and 35 are combined, and then the combined file is displayed to a display device.

Alternately, it is to be understood that the overlay function may be performed in the individual workstations.

Figure 3:
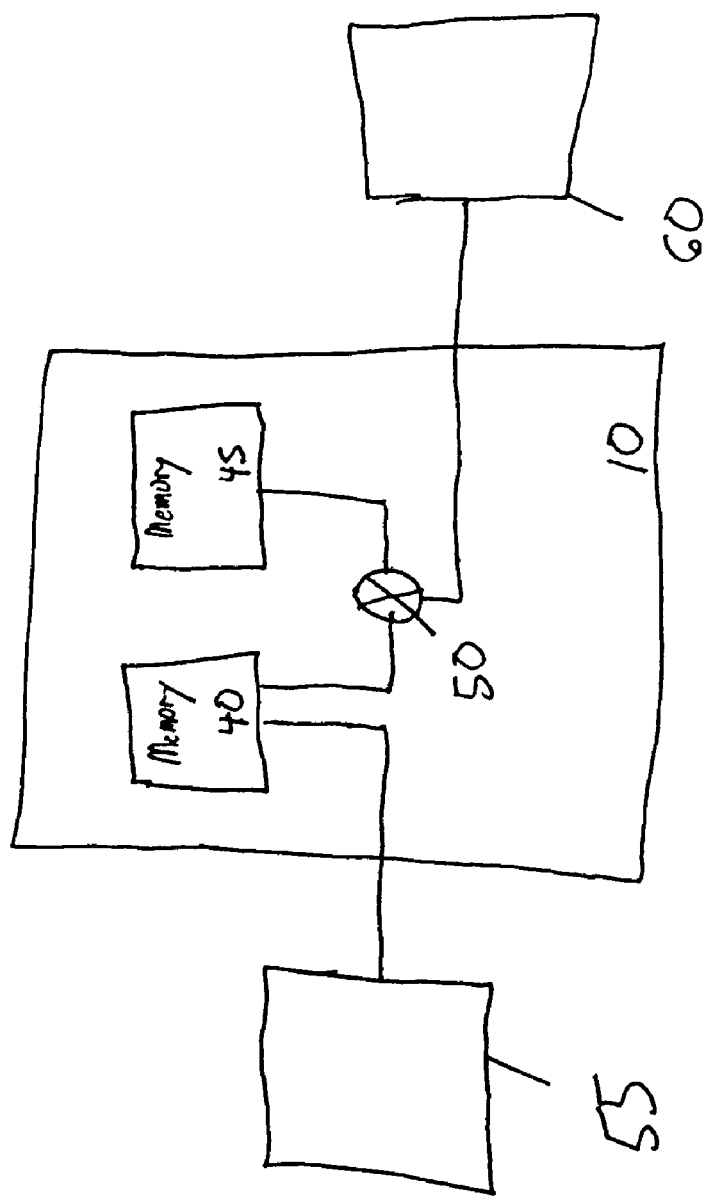
FIG. 3 is a block diagram of an example user workstation for use with the present invention.

FIG. 3 is a block diagram of an example user workstation 10 (which may be a personal desktop or notebook computer, Internet appliance, personal digital assistant, and the like) having first and second memories 40 and 45. In an example embodiment, one or both of these memories may be VGA memories. Such VGA memories may be implemented as a plurality of VGA memory chips. In an example embodiment, the first memory 40 may store the primary or main file which, as discussed above, may be a presentation, or a document for collaboration by a number of users. Meanwhile, the second memory 45 stores the annotation file which, as discussed above, may be presenter notes, annotation notes, and the like.

As shown in FIG. 3, the user workstation 10 may be connected to a workstation screen 60 and also may be connected to a presentation screen 55. Such a presentation screen may receive the output of a projector which is coupled to the workstation 10 via appropriate cabling. As shown in FIG. 3, the overlay junction 50, which may be a coupler, switch, combined memory or the like, may be used to send both files to the workstation screen 60.

In an example embodiment, the files stored in memory may be viewed as a bit map of all the pixels in the display. The overlay junction 50 replaces the value of a pixel with the desired value according to the annotation file. For example, if the annotation file indicates that a particular pixel should be displayed as black, then the overlay junction 50 will replace the value of first memory 40 with zero, when the second memory 45 indicates that a pixel has overlay content. As a result, both the main file stored in the first memory 40 and the annotation file stored in the second memory 45 may be shown on the workstation screen 60, while only the presentation file may be shown on the presentation screen 55.

Figure 4:
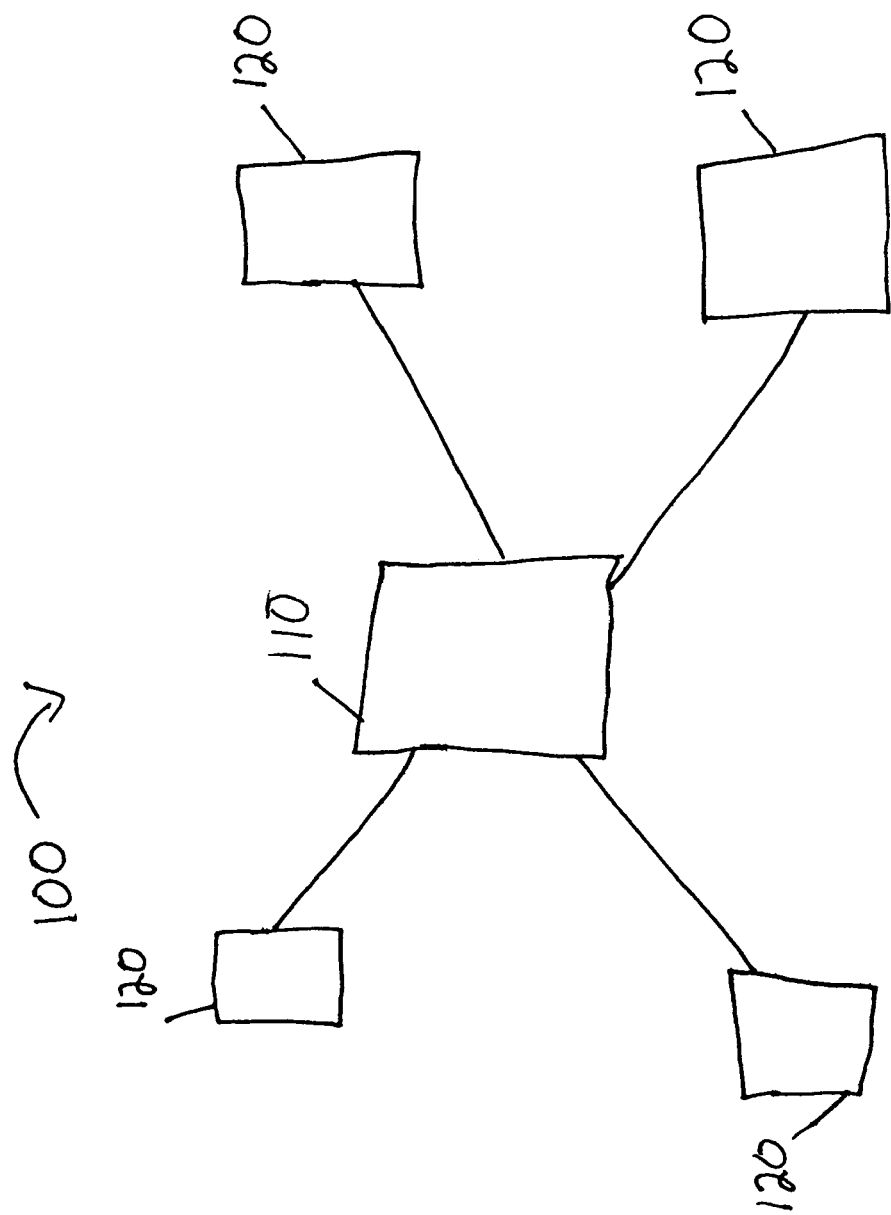
FIG. 4 is a block diagram of an example embodiment of a customer service system that implements the present invention.

In other embodiments, it is to be understood that instead of a presentation screen, one or more remote user workstations may be interconnected to user workstation 10 via the Internet or other communication network. For example, an embodiment may include a central customer service system 100 having a server 110 and a number of interconnected representative workstations 120 staffed by customer service representatives, as shown in FIG. 4. The server and workstations may be any of a number of well known commercially available products from manufacturers such as IBM, DELL, COMPAQ, and the like.

In the embodiment of FIG. 4, the central service system 100 is adapted to communicate with remote customers. Further, the system 100 is adapted to permit a customer and representative to both view a file relating to the customer's account. At the same time, the representative may view a second file relating to the jointly viewed file. For example, the system 100 may be used by a remote customer and a customer service representative regarding accounts, orders, and the like, such as a bank account, credit account, or business account.

In the example of a bank account, the customer and representative may both (simultaneously) view information about that customer's account. For example, both the customer and representative may access via a URL a website showing customer information. Such information may relate to the account, including deposit, withdrawal, and other such information. However, the representative may view additional information regarding the account or the customer which is not viewable by the customer. This information may be available via a second URL to which only the representative has access. Such information may include comment or note fields that have been created by the representative or other bank personnel. As discussed above, these fields may be part of an annotation file, and may be appended to the main account file, or may be a separate file. Further, as discussed above, if separate files, the annotation file may be stored in a different memory unit than the main account file. It is to be understood that additional representatives may also have access to both the main file and the annotation file, at the control of the first representative.

In the embodiment in which two URL's exist, these URL's may be synchronized via appropriate control software, so that if the representative makes a note, it will be added to the file of the URL that is only available to the representative.

By use of the system and methods disclosed herein, a user may be able to provide a presentation via a global computer network, presentation device or the like, in which a presentation is shown to the group of users or attendees, while the presenter also views, as an overlay, notes or annotations regarding the presentation. Additionally, a user may view both a source file and an annotation file, while at the same time permitting a remote user access to the source file. Further, use of the methods and system disclosed herein permit a group of users remotely located from each other to collaborate synchronously on a single file and further permit those users to view, create or modify a secondary file, which may include annotations, notes, and the like, and which are displayed only on that user's workstation, and which remain invisible to the other users.

OTHER EMBODIMENTS

While the invention has been described with respect to the embodiments and variations set forth above, these embodiments and variations are illustrative and the invention is not to be considered limited in scope to these embodiments and variations. For example, the invention may be provided via software encompassing any computer readable medium, such as CD-ROM, diskette, ZIP disk, tapes, ROM, RAM, hard drive and the like. Accordingly, various other embodiments and modifications and improvements not described herein may be within the spirit and scope of the present invention, as defined by the following claims.

What is claimed is:

1. A method of displaying an electronic file to a primary user having a primary workstation coupled to a videoconferencing system via a computer network, and displaying said electronic file to at least one secondary viewer via a secondary workstation connected to said computer network at a remote location, comprising:

conducting a videoconference between said primary and secondary workstations via a multiway conferencing unit (MCU);

displaying contents of a first file on said primary workstation while conducting said videoconference;

displaying said contents of said first file on the secondary workstation during said videoconference;

accessing a second file comprising information relating to said first file;

displaying first and second contents of said second file on said primary workstation as a primary workstation overlay displayed on top of said displayed contents of said first file by replacing a pixel of said displayed contents of said first file displayed on said primary workstation with a pixel of the primary workstation overlay so that the primary workstation overlay and a portion of the displayed contents of said first file are simultaneously viewable on said primary workstation; and displaying said second contents of said second file on said secondary workstation as a secondary workstation overlay while not displaying said first contents of said second file on said secondary workstation, said secondary workstation overlay displayed on top of said displayed contents of said first file by replacing a pixel of said displayed contents of said first file displayed on said secondary workstation with a pixel of the secondary workstation overlay so that the secondary workstation overlay and a portion of the displayed contents of said first file are simultaneously viewable on said secondary workstation.

2. The method of claim 1, wherein said second file comprises annotations to said first file.

3. The method of claim 2, further comprising:

displaying said contents of said first file on another secondary workstation; and displaying said first contents of said second file as an overlay to said displayed contents of said first file on said another secondary workstation.

4. The method of claim 3, wherein said primary workstation comprises a plurality of memory units, and wherein said first file is stored in a first memory unit and said second file is stored in a second memory unit.

5. The method of claim 4, wherein said first and second contents of said second file are overlaid over said contents of said first file using means for coupling said first file and said second file.

6. The method of claim 3, wherein said said computer network comprises the Internet.

7. The method of claim 1, wherein said first file and said second file are stored in a server computer.

8. The method of claim 7, wherein said first file and second file are a single file, and said second file contains a code to indicate that said first contents of said second file are not for display at said secondary workstation.

9. The method of claim 1, further comprising activating said first file for editing by said at least one secondary viewer.

10. A machine readable storage medium comprising a set of instructions executable by a computer system to implement a method of displaying an electronic file to a primary user having a primary workstation, said primary workstation coupled to a videoconferencing system via a computer network, and displaying said electronic file to at least one secondary viewer via a secondary workstation at a remote location, the method comprising:

conducting a videoconference between said primary and secondary workstations via a multiway conferencing unit (MCU);

displaying contents of a first file on said primary workstation while conducting said videoconference;

displaying said contents of said first file on the secondary workstation during said videoconference;

accessing a second file comprising information relating to said first file;

displaying first and second contents of said second file on said primary workstation as a primary workstation overlay on top of said displayed contents of said first file by replacing a pixel of said displayed contents of the first file displayed on the primary workstation with a pixel of the primary workstation overlay so that the primary workstation overlay and a portion of the displayed contents of said first file are simultaneously viewable on said primary workstation; and displaying said second contents of said second file on said secondary workstation as a secondary workstation overlay while not displaying said first contents of said second file on said secondary workstation, said secondary workstation overlay displayed on top of said displayed contents of said first file by replacing a pixel of said displayed contents of the first file displayed on the secondary workstation with a pixel of the secondary workstation overlay so that the secondary workstation overlay and a portion of the displayed contents of said first file are simultaneously viewable on said secondary workstation.

11. The machine-readable storage medium of claim 10, wherein the machine-readable storage medium includes a magnetic storage medium, including one of a disk and tape storage medium, an optical storage medium, a compact disk memory, a digital video disk storage medium; a nonvolatile memory storage memory; and a volatile storage medium.

12. A videoconferencing system, comprising:

a computer network;

a multiway conferencing unit (MCU) connected to said computer network;

a primary workstation coupled to said MCU via said computer network;

a secondary workstation coupled to said MCU via said computer network;

a data server connected to said primary and secondary workstations via said computer network, said data server configured to store said first file and a second file including information relating to said first file; and a data display controller configured to enable a user at the primary workstation to display said first file, and to display first and second contents of said second file on said primary workstation as a primary workstation overlay displayed on top of said displayed contents of said first file by replacing a pixel of said displayed contents of the first file displayed on the primary workstation with a pixel of the primary workstation overlay so that the primary workstation overlay and a portion of the displayed contents of said first file are simultaneously viewable on said primary workstation, said data display controller further configured to enable a second user at the secondary workstation to display said first file on said secondary workstation and to display said second contents of said second file as a secondary workstation overlay to said first file while not displaying said first contents of said second file on said secondary workstation, said secondary workstation overlay displayed on top of said displayed contents of said first file by replacing a pixel of said displayed contents of the first file displayed on the secondary workstation with a pixel of the secondary workstation overlay so that the secondary workstation overlay and a portion of the displayed contents of said first file are simultaneously viewable on said secondary workstation.

* * * * *